Sept. 16, 1969  E. J. GIRARD  3,467,154
SHINGLE CUTTING MACHINE
Filed June 27, 1967  4 Sheets-Sheet 1
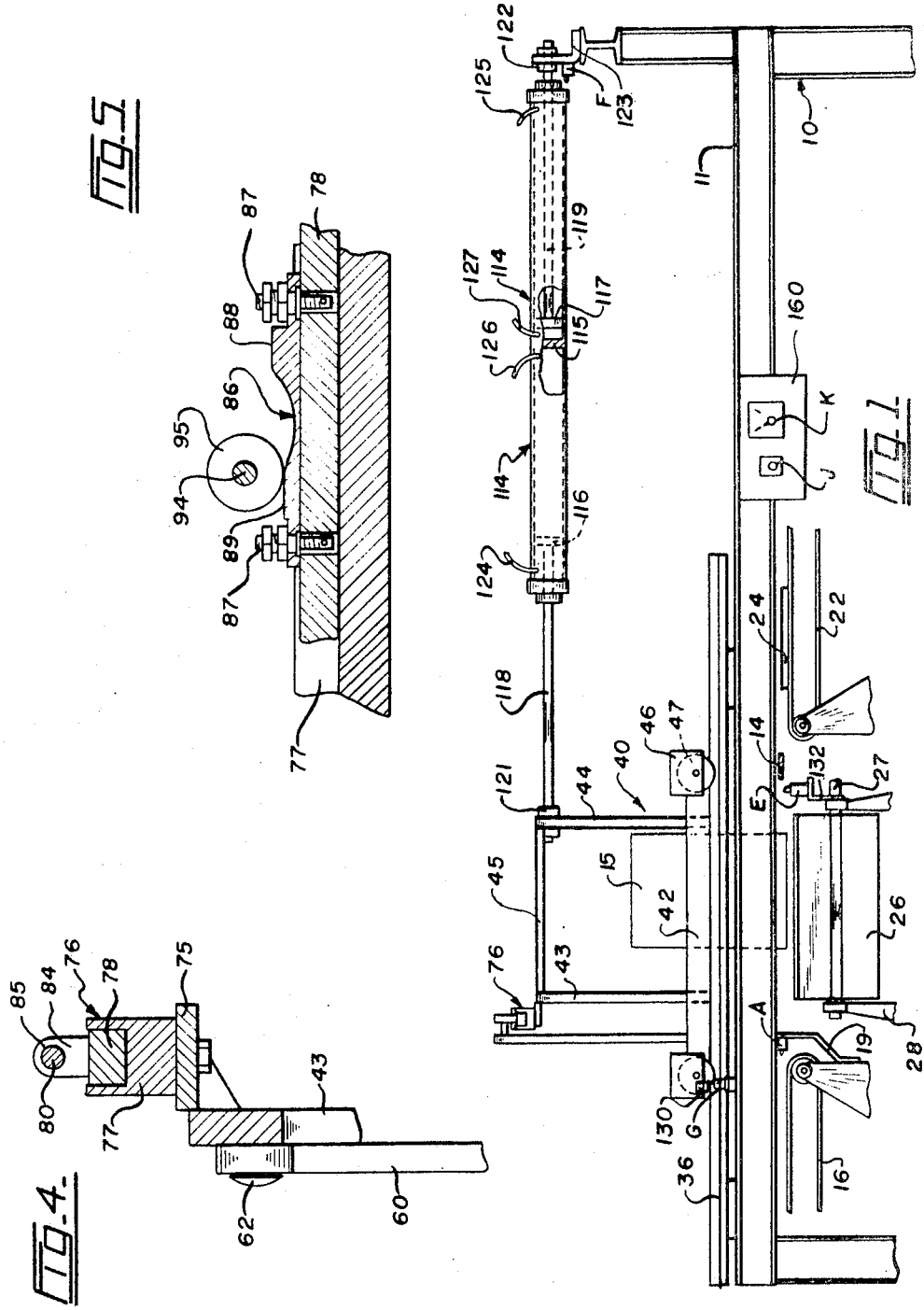
INVENTOR
ERNEST J. GIRARD
BY
Fetherstonhaugh & Co.
ATTORNEYS

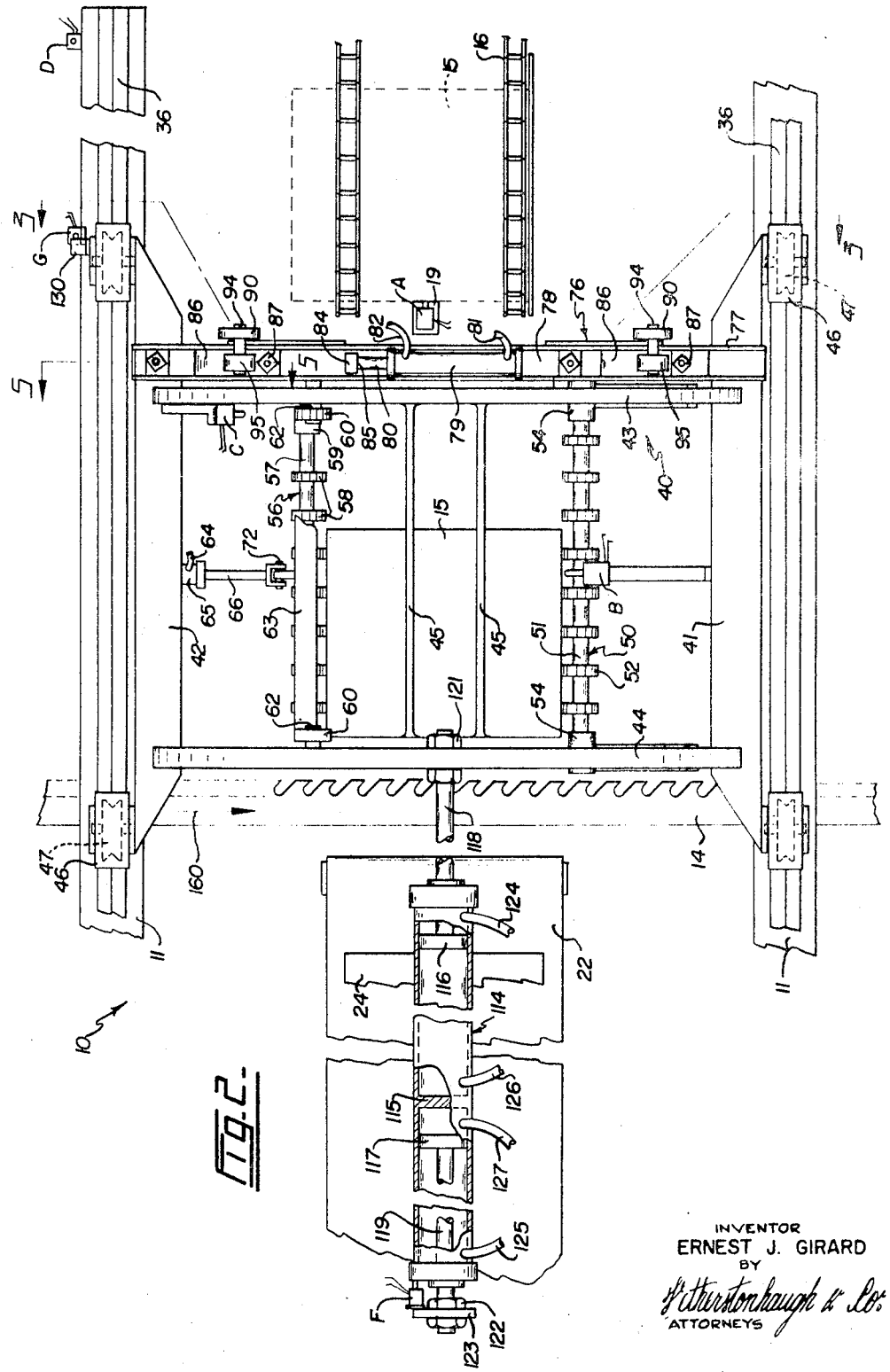

Sept. 16, 1969     E. J. GIRARD     3,467,154
SHINGLE CUTTING MACHINE
Filed June 27, 1967     4 Sheets-Sheet 3
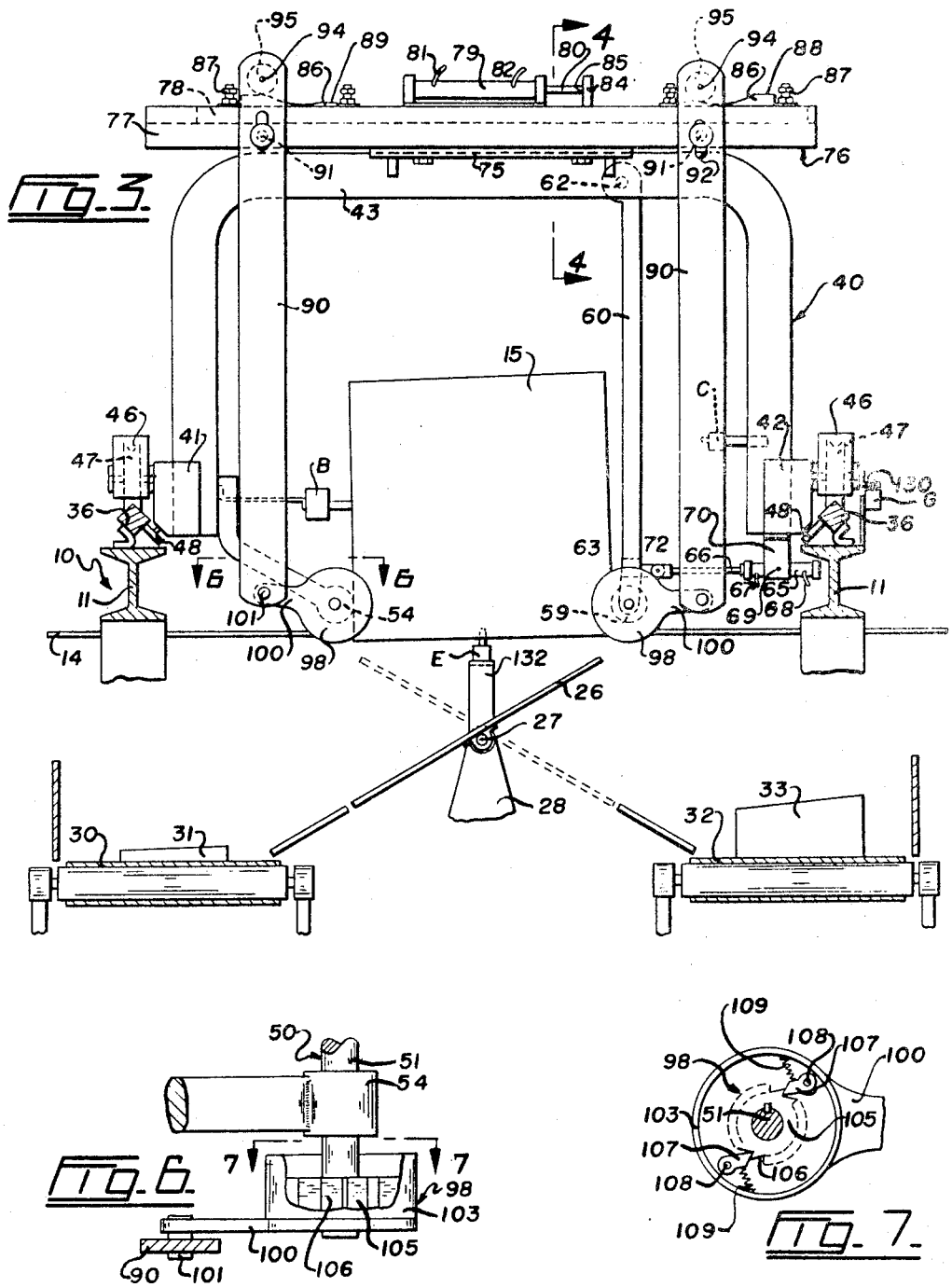
INVENTOR
ERNEST J. GIRARD
BY
Fetherstonhaugh & Co.
ATTORNEYS

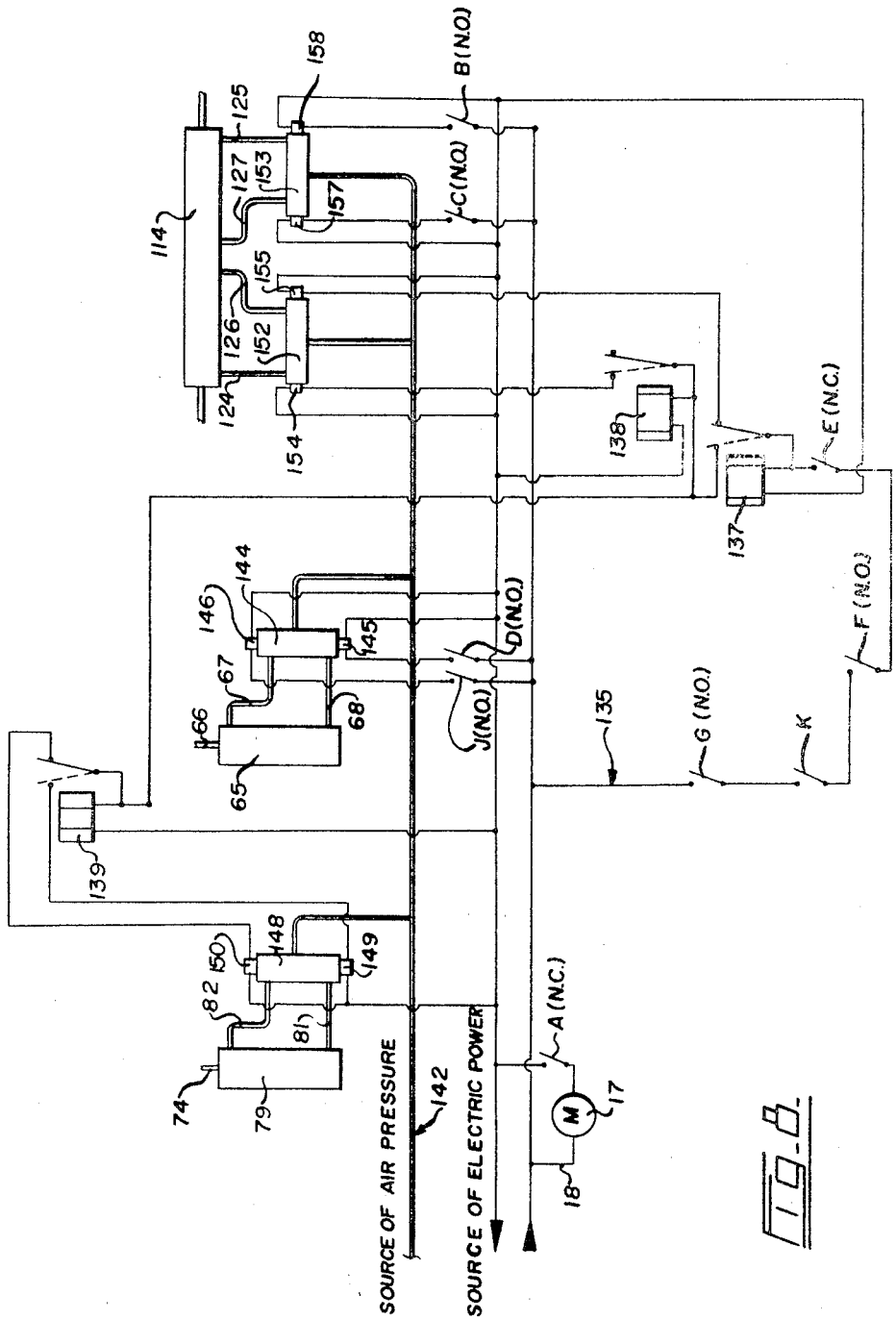

United States Patent Office 3,467,154
Patented Sept. 16, 1969

3,467,154
SHINGLE CUTTING MACHINE
Ernest J. Girard, West Vancouver, British Columbia, Canada, assignor to North Shore Shingle Co. Ltd., Vancouver, British Columbia, Canada
Filed June 27, 1967, Ser. No. 649,281
Int. Cl. B27b 29/08
U.S. Cl. 143—115          15 Claims

ABSTRACT OF THE DISCLOSURE

A machine having a block supporting carriage mounted for reciprocation past a saw blade. Setworks on the carriage function automatically to feed the block to the saw. Controls on the machine operate automatically to regulate the cutting stroke of the carriage according to the width of each block.

BACKGROUND OF THE INVENTION

This invention relates to improvements in shingle cutting machines and more particularly to a machine adapted for use in mass producing shingles or similar panel-like articles which are cut from a wood block.

A machine for cutting shingles should be capable of handling shingle bolts or blocks of various sizes. Normally, each block is cut to the required length and is side trimmed before being reduced to shingles. However, the thicknesses of the precut blocks vary to some extent and often their widths will vary a great deal. This lack of uniformity in size makes it difficult to provide a machine wherein the shingle sawing operation is performed with a small amount of manual assistance as must be the case if any sort of economy of production is to be achieved. Desirably, the sawing operation should be as fully automatic as possible and also should be one which provides for a rapid and substantially continuous production of accurately sawn shingles.

SUMMARY OF THE INVENTION

The shingle cutting machine forming the basis of the present invention employs a block supporting carriage having two roller jaws. One of the jaws is movable towards and away from the other jaw and power means operate this movable jaw to clamp a shingle block between the two jaws. Both jaws are rotatably mounted and setwork means on the carriage itself periodically counter-rotate the jaws to tilt and at the same time feed the block from the carriage. This tilting and feeding of the block is done automatically as the carriage is reciprocated past a continuously operating saw which rapidly reduces the block to shingles. The cutting stroke of the carriage is adjusted automatically according to the width of each block so as to provide a corresponding reduction in the time required to reduce each block to shingles. The carriage loading operation is performed with speed and precision by the machine without manual assistance once a signal is given for it to do so by the machine operator.

BRIEF DESCRIPTION OF THE DRAWINGS

FIGURE 1 is a side elevation of the shingle cutting machine, in accordance with the present invention, the view being somewhat diagrammatic with some details purposely omitted.

FIGURE 2 is an enlarged fragmentary plan of the machine, the left and right ends of the machine being reversed from the positions shown in FIGURE 1.

FIGURE 3 is a vertical section taken on the line 3—3 of FIGURE 2.

FIGURE 4 is a detail section taken on the line 4—4 of FIGURE 3.

FIGURE 5 is a detail section taken on the line 5—5 of FIGURE 2.

FIGURE 6 is a detail section taken on the line 6—6 of FIGURE 3.

FIGURE 7 is a detail section taken on the line 7—7 of FIGURE 6.

FIGURE 8 is a simplified diagrammatic view of the combined electrical and pneumatic circuits on the machine.

DESCRIPTION OF THE PREFERRED EMBODIMENTS

The shingle cutting machine consists of a frame 10 having side members 11. A horizontally disposed band saw, not shown, is mounted on or near the frame 10. The endless band saw blade has an operating or cutting run 14 which extends across said frame below the side members 11. The band saw and its associated parts are of conventional design and further illustration or description is not considered necessary.

The present machine is adapted to cut shingles from blocks 15 which are delivered thereto by an infeed conveyor 16. This conveyor is driven by an electric motor 17, see FIGURE 8 only, having a circuit 18 in which a normally closed limit switch A is included. In FIGURES 1 and 2, it will be seen that the switch A is mounted on a suitable bracket 19 carried by the inner end of the conveyor 16 which conveyor end extends between the side members 11 on the left end (FIGURE 1 only) of the frame 10. When switch A is contacted by a shingle block, the circuit 18 is broken and the conveyor is halted until such time as said block is removed. The shingle blocks are placed on the infeed conveyor with their longitudinal axes at right angles to the corresponding axis of said conveyor. It is a side edge of the block which contacts switch A. When mention is made herein to the left and right ends of the machine, it should be noted that this refers to the structure as viewed in FIGURE 1.

An outfeed conveyor 22 is provided at the opposite or right end of the machine. In this particular embodiment, conveyor 22 is aligned with conveyor 16 although it can be disposed at right angles thereto if desired. Conveyor 22 is run continuously when the machine is in operation and receives shingles 24 as they are cut from the blocks 15 and delivers said shingles to a dryer or other equipment for whatever further processing is required.

Between the two conveyors 16 and 22, the frame 10 is provided with a ramp 26 which is mounted on a longitudinally extending shaft 27, see FIGURES 1 and 3 only. Shaft 27 is journalled in standards 28 below the frame side members 11 and suitable means, not shown, is provided whereby the machine operator can rock the ramps 26 selectively between the solid and dotted line positions shown in FIGURE 3. When in the solid line position, the ramp 26 leads downwardly to a waste removing conveyor 30, also shown in FIGURE 3 only. The conveyor 30 receives waste blocks 31 from the machine and delivers them, for example, to a chipper. When in the dotted line position of FIGURE 3, the ramp 26 slopes downwardly to another conveyor 32 beneath the opposite side of the machine frame 10. Partially sawn shingle blocks 33 are deposited on the conveyor 32 by the ramp when it is so positioned and said conveyor leads to the loading end of the infeed conveyor 16 so that the blocks 33 can be recycled through the shingle cutting machine.

Each side member 11 of the machine frame supports a track 36 and mounted on these two tracks is a carriage generally indicated by the numeral 40. Carriage 40 has side members 41 and 42 which are cross connected by inverted U-shaped yokes 43 and 44. Preferably, the upper ports of the yokes are reinforced by longitudinal members 45. A laterally projecting housing 46 is carried at opposite ends of both side members 41 and 42. Journalled in each of the housings 46 is a wheel 47. The four wheels 47 ride on the tracks 36 and enable the carriage 40 to roll back and forth thereon. Removably fitted to each housing 46 is a retainer 48 in the form of a small roller. The retainers 48 engage lower faces of the tracks 36 and prevent the carriage from being dislodged therefrom.

One side of the carriage 40 is fitted with a roller jaw 50. Jaw 50 consists of a cylindrical shaft 51 on which a number of integrally formed and longitudinally spaced spur rolls 52 are carried. The shaft 51 is journalled in bearings 54 carried by the side member 41 of the carriage.

The other side of the carirage has a similarly constructed jaw 56 having a shaft 57 and spur rols 58. This jaw is mounted in bearings 59 which are carried on the lower end of two spaced bars 60. The upper ends of the normally vetrically disposed bars 60 are secured to the yokes 43 and 44 by means of hinge pins 62. Near the bearings 59, the bars 60 are connected by a side member 63.

The roller jaw 56 is adapted to be swung about the hinge pins 62 by means of a double acting air cylinder 65 having a piston rod 66, see particularly FIGURE 3. Hoses 67 and 68 are fitted to opposite ends of the cylinder 65, said hoses being connected to a suitable source of air pressure as indicated in FIGURE 8. Cylinder 65 which herein will be referred to as a clamp cylinder, is fitted with trunnions 69. The trunnions 69 are suitably mounted in a bracket 70, said bracket being secured to the underside of the side member 42 of the carriage. The piston rod 66 is pivotally connected as at 72 to the side member 63 connecting the two swingingly mounted bars 60. By applying air pressure to the appropriate ends of the cylinder 65, the movable jaw 56 can be moved towards and away from the opposing fixed jaw 50. When the pair of jaws 50 and 56 are closed by the above described mechanism, they are adapted to grip the opposite ends of the shingle block and support said block as best shown in FIGURES 2 and 3.

As shown best in FIGURES 3 and 4, the carriage yoke 43 is provided with a bracket 75 and mounted on this bracket is a setworks which is generally indicated by the numeral 76. The setworks 76 includes a length of channel 77 in which a plunger 78 is slidably mounted. Mounted on the channel 77, near the center thereof, is a small double acting air cylinder 79 having a piston rod 80. The opposite ends of the setworks cylinder 79 are adapted to be charged with air through hoses 81 and 82. As shown in FIGURE 8 only, these two hoses are connected to an air pressure source. A lug 84 is secured to the plunger 78 and the piston rod 80 is fastened to said lug as at 85. Thus, the plunger 78 can be reciprocated in the channel 77 by alternately pressurizing opposite ends of the setworks cylinder 79.

Each end of the plunger 78 is fitted with a cam track 86 which is secured thereto by two adjusting bolts 87, see FIGURES 2, 3 and particularly FIGURE 5. The cam tracks 86 are each provided, at their outer and inner ends respectively, with a high lobe 88 and a low lobe 89. The bolts 87 are of a suitable type which will enable the lobes 88 and 89 to be adjusted vertically as required.

The carriage 40 is provided with two vertically extending arms 90 which are secured to one side of the channel 77 by means of suspension pins 91. Slots 92 are formed in the arms 90 and the pins 91 extend through these slots to permit said arms to slide up and down thereon. Secured to the upper ends of the arms 90, by means of spindles 94, are cam followers 95 in the form of small wheels which ride on the top surfaces of the cam tracks 86.

The opposing pair of roller jaws 50 and 56 are each connected to an adjoining arm 90 by means of a ratchet drive 98, see detail in FIGURES 6 and 7. Since the two ratchet drives 98 are identical, only the drive to the jaw 50 will be described in detail and enumerated. Each ratchet drive 98 consists of a lever 100 which is pivotally secured to the adjacent arm 90 by means of a pivot pin 101. The opposite end of the lever 100 is enlarged and is provided with a circular flange 103. This flanged end of the lever 100 is rotatably mounted on the shaft 51 with the flange 103 being concentric about said shaft. A collar 105 is keyed to the shaft 51 within the flange 103 and formed on the periphery of said collar are ratchet teeth 106. Pawls 107 engage the teeth 106, the pawls being mounted on pivot pins 108 carried by the lever 100. Springs 109 are interposed between the flange 103 and the pawls 107 to keep said pawls in engagement with the teeth 106. In this manner, the ratchet drive 98 operatively connects the arm 90 to the shaft 51. When the arm 90 is raised, the shaft 51 is given a partial turn in a clockwise direction. As the arm 90 is lowered, the pawls 107 ride over the teeth 106 while the shaft 51 remains stationary. The shaft 57 of the movable roller jaw 56 is similarly operated by its ratchet drive 98 but in the opposite counterclockwise direction as viewed in FIGURE 3. Thus, the shingle block supported between the jaws can be fed progressively out of the carriage so that the lower edge of said block will project a selected distance below the blade 14 of the band saw. Due to the difference in the heights of the cam lobes 88 and 89, one jaw is rotated through a greater arc than the other jaw so that the block is tilted as it is fed from the carriage.

The carriage 40 is adapted to be reciprocated on the tracks 36 by suitable means. The means illustrated best in FIGURE 2 consists of a compound air cylinder 114 which is divided into two equal parts by a central partition 115. Pistons 116 and 117 are mounted in opposite ends of the horizontally disposed compound cylinder 114, said pistons being fitted with piston rods 118 and 119. Rod 118 is secured as at 121 to the yoke 44 of the carriage. The piston rod 119 is similarly secured as at 122 to an upright 123 on the frame 10. Air hoses 124 and 125 communicate with opposite ends of the compound cylinder 114 and other hoses 126 and 127 are fitted to said cylinder one on each side of the partition 115. Hoses 124 to 127 are connected to a suitable air pressure source, see FIGURE 8 only.

The cylinder 114 and the parts associated therewith enable the carriage 40 to be moved from the center position shown in the several views, to a block loading position on the left and a shingle discharge position on the right. In loading position, the carriage 40 is disposed over a block 15 on the innermost end of the conveyor 16. The shingle discharge position of the carriage is over the left end of the outfeed conveyor 22. Carriage 40 executes a cutting stroke and a return stroke when travelling from the center position to the shingle discharge position and returning to its original starting position. In order for the carriage to be moved through the cutting and return strokes, a charge of air is maintained in the right end of the compound cylinder 114 to keep the piston 117 fully retracted and to hold said cylinder stationary. Air is then fed alternately through the hoses 124 and 126 to extend and retract the piston rod 118, whereupon the carriage is reciprocated through the desired cutting and return strokes. To move the carriage 40 from the center position to the loading position, air is fed through the hoses 126 and 127. This fully extends both the piston rods 118 and 119 and causes the cylinder 114 to move to the left as well.

The above-mentioned carriage movements, as well as others which will now be described, are controlled partly by a number of electric switches which are similar in construction and operation to switch A. Suitably, these switches can be the type having a small plunger or button which, when depressed, will operate the switch and cause it to open or close a circuit as the case may be.

Included among these switches is one designated by the letter B (FIGURES 2 and 3). Switch B is a normally open switch mounted on the side member 41 of the carriage so as to be closed by a block 15 when said block is clamped bewteen the jaws 50 and 56.

Another normally open switch C is carried by the yoke 43 of the carriage (shown best in FIGURE 2). Switch C is contacted and closed by an arm 60 when the movable jaw 56 is swung to a fully open position.

A normally open switch D is mounted on the left end of one of the side members 11 of the machine frame 10, see particularly FIGURE 2. The adjoining carriage housing 46 has a laterally projecting finger 130 which engages and closes switch D when the carriage 40 is in loading position.

A normally closed switch E is mounted in an upright position on a part 132 of the frame 10, see particularly FIGURE 3. This switch is located near the cutting edge of the saw blade 14 with its operating plunger projecting above said blade and also the lowermost surface of a block 15 supported in the carriage. Thus, the switch E is opened by the block very shortly before said block is engaged by the saw blade and is allowed to reclose almost immediately after the block has passed over said blade. Similarly, switch E is opened and reclosed by the block during the return stroke of the carriage.

A normally open switch F is mounted on the frame upright 123 above the outfeed conveyor 22 (FIGURE 1). Switch F is engaged and closed by the right end of the cylinder 114 just as said cylinder comes to a halt after moving the carriage 32 from the loading position back to the center position.

Still another normally open switch G is mounted on a side member 11 of the machine frame 10 as shown best in FIGURE 3. Switch G is engaged and closed by the finger 130 when the carriage 40 is in center position.

Referring now to FIGURE 8, the several above-mentioned switches are shown connected in a circuit which is generally indicated by the numeral 135. For the sake of clarity, and in order to better explain the operation of the machine, only the essential parts of circuit 135 are illustrated. The circuit 135 also includes relays 137, 138 and 139. Relays 137 and 139 are holding relays and operate as follows: when each relay coil is first energized, the armature will swing to the dotted line position and the next impulse to said coil will swing the armature to the solid line position. Relay 138 is a time delay relay. Normally the armature of this relay is in the solid line position. When the coil of relay 138 is energized, the armature swings to the dotted line position, but only after a predetermined time lapse.

In FIGURE 8, the numeral 142 indicates a pneumatic circuit for the cylinder 65, 79 and 114. Circuit 142 includes a distribution valve 144 which is provided with operating solenoids 145 and 146. The hoses 67 and 68 connect the valve 144 to the opposite ends of the clamp cylinder 65.

The hoses 81 and 82 of the setworks cylinder 79 are connected to a similar valve 148. This valve is operated from a neutral position to direct air to either of the hoses by solenoids 149 and 150.

The carriage operating compound cylinder 114 is providede with two air valves 152 and 153 of the previously-described type. Valve 152 has operating solenoids 154 and 155 which, when energized, operate the valve to direct air to the hoses 124 and 126 respectively. Solenoids 157 and 158 on the valve 153 operate said valve to direct air through the hoses 127 and 125 respectively.

In addition to the previously-mentioned switches, the machine is provided with a control panel 160 (see FIGURE 1 only) on which manually control switches J and K and mounted. Switch J is a normally open push button switch and switch K is simply an on-off switch of a suitable type.

Before starting the shingle cutting machine, the operator adjusts the two cam tracks 86 by means of the bolts 87. The high lobes 88 of the tracks 86 are set at the same height which corresponds to the desired thickness of the butt ends of the shingles which are to be cut by the machine. The low lobes 89 are similarly adjusted to a height which will be proportionate to the desired thickness of the shingle tips.

The shingle cutting machine starts its operating cycle with the carriage 40 in the center position over the ramp 26. The switch A has halted a block 15 at the loading end of the infeed conveyor 16 and the outfeed conveyor 22 is in operation. The band saw is running to move the blade 14 at high speed in the direction of arrow 160 of FIGURE 2. To start the actual shingle cutting, the machine operator momentarily presses switch J. As will be seen in FIGURE 8, this will energize solenoid 146 which will actuate valve 144 to direct air into the clamp cylinder 65 so as to swing the movable jaw 56 to a fully open position. The opening of the roller jaw 56 closes switch C, switch B being already open at this time. The closing of switch C, after a suitable time delay, results in the solenoid 157 of valve 153 being energized whereupon the compound cylinder 114 is fully extended to move the carriage 40 from center position to loading position. Switch D is closed by the carriage in loading position, and energizes the solenoid 145 of valve 144. This causes the roller jaws to close on opposite ends of the block 15 on the loading end of the infeed conveyor. When the block is gripped by the jaws, switch C is opened and switch B is closed. The closing of switch B energizes solenoid 158 so that the valve 153 is operated to pressurize the cylinder 114 and return the carriage from the loading position to the center position. As the cylinder 114 returns the carriage to the center position, switches F and G are closed.

The machine operator now closes switch K which places the shingle cutting machine on automatic operation. Current flows through switches G, K, F and normally closed switch E to energize relay 137 which connects relays 138 and 139 to the power source. Relay 139 supplies current to solenoid 149 which operates valve 148 to actuate the setworks 76. The setworks and associated part rotate the opposing jaws as previously described so as to feed and tilt the block to, say, the position shown in FIGURE 3. Immediately following the feeding and tilting of the shingle block, the relay 138 energizes solenoid 154 and valve 152 is operated to feed air to the cylinder 114 and start the carriage 40 on the cutting stroke so that a tapered shingle is sawn from the block.

During the cutting stroke, switch E is contacted by the block being sawn and momentarily is opened. Once the shingle block has cleared the normally closed switch E, said switch is allowed to reclose. The reclosing of switch E sends an impulse to solenoid 155 which operates valve 152 so that the cylinder 114 is pressurized to start the return stroke. During the return stroke, switch E is engaged by the underside of the shingle block first open and then reclosed. When switch E recloses as the carriage approaches center position, another impulse is fed to relay 139 and also to solenoid 154 through relay 138. This results in the set works 74 operating to feed and give opposite tilt to the shingle block supported in the carriage and in the start of another cutting stroke during which a shingle of opposite taper is cut.

It will be recalled that switch E is wiped by the underside of the shingle block being cut. Therefore, it is the width of the block which determines how long switch E will be held open. Each time switch E is allowed to reclose, another electric impulse is fed into the circuit 142 which results in the carriage 40 reversing its direction. Thus, the length of the cutting and return stroke is only slightly greater than the width of each block. Since the blocks vary a great deal in width, this automatic adjustment of the machine according to block width, effects a considerable saving in the time required to reduce a given number of blocks to shingles.

When the block has been reduced to a point where no further cutting is practical, the machine operator opens switch K which removes the machine from automatic operation. It will be noticed that switch G is connected in series with switch K so that the carriage 40 will halt only when in center position. The operator then presses switch J to open the jaws of the carriage. The stub of the block which is then supported in the carriage drops on to the ramp 26, the ramp having previously been swung to direct the stub either to the waste conveyor 30 or to the recycling conveyor 32 according to the wishes of the machine operator.

This completes the sawing of one block into shingles. In the meantime, another block has been moved up by the infeed conveyor 16 and has been halted by the opening of switch A. Switches D and C are actuated when the jaws are opened to release the cut block so that the carriage is moved from the center position to the loading position over the next block on the end of the infeed conveyor. It will be seen then that the loading operation is entirely automatic once the operation has been initiated by the machine operator momentarily closing switch J. Also, the carriage is returned to the center position without assistance from the operator. When switch K is actuated to place the machine on automatic, the cutting of the shingle is entirely controlled by the machine itself.

From the foregoing it will be apparent that the present machine, operating in the manner described, can produce large volumes of accurately sawn shingles in a very short space of time. A single operator can supervise the operation of the machine and can stop the machine at any time by manipulation of switch K.

What is claimed is:

1. A shingle cutting machine comprising a reciprocable carriage, opposing roller jaws rotatably mounted in the carriage, one of the roller jaws being mounted for movement twoards and away from the other of said roller jaws, means for clamping a shingle block between the roller jaws, and means for periodically rotating the roller jaws to project an edge of the shingle block a predetermined distance from the carriage.

2. A shingle cutting machine as claimed in claim 1, in which the means for periodically rotating the roller jaws operates alternately to rotate one roller jaw through a greater arc than the other roller jaw whereby to tilt the shingle block as said block is projected from the carriage.

3. A shingle cutting machine as claimed in claim 2, in which the means for periodically rotating the roller jaws includes a plunger slidably mounted on the carriage, a cam track mounted on each end of the plunger, a cam follower engaging each cam track, each of said cam followers being mounted on one end of an arm, a ratchet drive operatively connecting the other end of each arm to a roller jaw, and means for reciprocating the plunger.

4. A shingle cutting machine as claimed in claim 3, said cam tracks each having a high lobe and a low lobe, said high and low lobes of each cam track being alternately traversed by the cam follower, and means for adjusting the high and low lobes to selectively vary the projection and tilt of the shingle block.

5. A shingle cutting machine comprising a frame, a horizontal saw blade extending transversely of the frame, a reciprocable carriage mounted on the frame above the saw blade, a first roller jaw rotatably mounted in the carriage, a second roller jaw rotatably mounted in the carriage in spaced and parallel relation to the first roller jaw, said second roller jaw being mounted for movement towards and away from the first roller jaw, means for moving the second roller jaw towards the first roller jaw to clamp a shingle block therebetween, means for reciprocating the carriage through a cutting stroke and a return stroke, and means for rotating the first and second roller jaws before each cutting stroke to tilt the shingle block in the carriage and simultaneously feed said shingle block to the saw blade.

6. A shingle cutting machine as claimed in claim 5, in which said frame adjoins an infeed conveyor for supplying shingle blocks to the carriage, means for halting the infeed conveyor when a shingle block reaches the innermost end of said conveyor, said reciprocating means for the carriage being adapted to extend the return stroke to move said carriage from a centre position to a loading position over a shingle block on the innermost end of the infeed conveyor.

7. A shingle cutting machine as claimed in claim 6, and including means responsive to a manually given signal for automatically controlling the operation of the carriage reciprocating means to move said wheeled carriage to said loading position and clamp a shingle block between the roller jaws and return the wheeld carriage to said centre position.

8. A shingle cutting machine as claimed in claim 5, and including means for automatically adjusting the cutting and return strokes to correspond to the width of the shingle block being cut by the saw blade.

9. A shingle cutting machine comprising a frame, a carriage mounted for reciprocation on the frame, first power operated means for moving the carriage from a centre position to a loading position and return, opposing roller jaws mounted on the carriage, second power operated means for opening and closing the roller jaws, said first and second power operated means being controlled by electrically operated control devices, an electric circuit for the control devices, said electric circuit including first, second, third and fourth switches, said first switch being manually operable to cause the roller jaws to be opened when the carriage is in centre position, said second and third switches being actuated by the opening of the roller jaws to cause the carriage to be moved from centre position to loading position, said fourth switch being actuated in response to the carriage reaching loading position to cause the roller jaws to be closed into supporting engagement with a shingle block at said loading position, said second and third switches being actuated by the closing of the pair of jaws on the shingle block to cause the carriage to be returned from loading position to centre position.

10. A shingle cutting machine as claimed in claim 9, in which said loading station is an infeed conveyor, electric motor means for driving the infeed conveyor, said electric motor means including an electric circuit having a motor switch, said motor switch being actuated by a shingle block when said shingle block is advanced by the infeed conveyor to the loading station whereby said infeed conveyor is halted until the shingle block is removed from the loading station.

11. A shingle cutting machine as claimed in claim 9, in which said first power operated means is also adapted to reciprocate the carriage from the centre position through a cutting and return stroke past a saw, said electric circuit including fifth and sixth switches, said fifth switch being manually operable to initiate the first cutting stroke of the carriage, said sixth switch being positioned in the path of a shingle block supported by the carriage to be traversed by said shingle block as said carriage is moved through said cutting and return strokes, said shingle block operating the sixth switch to cause the direction of travel of the carriage to be reversed immediately following disengagement of the sixth switch by the shingle block.

12. A shingle cutting machine as claimed in claim 9, in which said roller jaws are rotatably mounted in the carriage, third power operated means on the carriage for rotating the roller jaws to project an edge of a shingle block supported therebetween a predetermined distance from the carriage, an electrically operated control device for the third power operated means, said electric circuit having a relay connected in series with the sixth switch, said relay and sixth switch co-operating to operate the third power operated means at the beginning of each cutting stroke.

13. A shingle cutting machine as claimed in claim 12, in which said third power operated means includes a plunger slidably mounted on the carriage, a cam track mounted on each end of the plunger, a cam follower engaging each cam track, each cam follower being mounted on one end of an arm, a ratchet drive operatively connecting the opposite end of each arm to one of the roller jaws, said plunger being moved endwise to counterrotate the roller jaws and feed the shingle block a predetermined distance from the carriage.

14. A shingle cutting machine as claimed in claim 13, in which each of said cam tracks has a high lobe and a low lobe, one of said cam followers engaging a high lobe when the other of said cam followers engages a low lobe whereby one of the roller jaws is rocked through a greater arc than the other of said roller jaws and the shingle block is tilted in the carriage.

15. A shingle cutting machine as claimed in claim 12, and including a time-delay relay in said electric circuit, said time-delay relay delaying the start of the cutting stroke until the third power-operated means is actuated.

References Cited

UNITED STATES PATENTS

| | | | |
|---|---|---|---|
| 927,248 | 7/1909 | Kennedy | 143—115 X |
| 1,785,439 | 12/1930 | Eckersley | 143—8 |
| 2,054,218 | 9/1936 | Gilmore | 143—8 X |
| 2,145,568 | 1/1939 | Faber | 143—8 |

HARRISON L. HINSON, Primary Examiner

U.S. Cl. X.R.

143—8, 17